United States Patent
Pourima

(10) Patent No.: US 10,443,953 B2
(45) Date of Patent: Oct. 15, 2019

(54) COMPRESSED GAS ENERGY STORAGE AND HARVESTING SYSTEM AND METHOD WITH STORAGE OF THE HEAT BY HEAT TRANSFER FLUID

(71) Applicant: IFP Energies nouvelles, Rueil-Malmaison (FR)

(72) Inventor: Christophe Pourima, Macon (FR)

(73) Assignee: IFP ENERGIES NOUVELLES, Rueil-Malmaison (FR)

(*) Notice: Subject to any disclaimer, the term of this patent is extended or adjusted under 35 U.S.C. 154(b) by 394 days.

(21) Appl. No.: 15/323,380

(22) PCT Filed: Jun. 22, 2015

(86) PCT No.: PCT/EP2015/064000
§ 371 (c)(1),
(2) Date: Dec. 30, 2016

(87) PCT Pub. No.: WO2016/001001
PCT Pub. Date: Jan. 7, 2016

(65) Prior Publication Data
US 2017/0138674 A1 May 18, 2017

(30) Foreign Application Priority Data
Jul. 3, 2014 (FR) .................... 14 56350

(51) Int. Cl.
*F01K 1/00* (2006.01)
*F28D 20/00* (2006.01)
(Continued)

(52) U.S. Cl.
CPC ............ *F28D 20/00* (2013.01); *F02C 6/16* (2013.01); *F28D 20/0056* (2013.01);
(Continued)

(58) Field of Classification Search
CPC ...... F02C 6/16; F28D 20/0056; F28D 20/023; F28D 20/00
(Continued)

(56) References Cited

U.S. PATENT DOCUMENTS 4,383,576 A 5/1983 Bricard et al.
2010/0251712 A1* 10/2010 Nakhamkin ............ F01K 3/12
60/659

(Continued)

FOREIGN PATENT DOCUMENTS

EP 0 023 866 A2 2/1981
EP 2447501 A2 5/2012
(Continued)

OTHER PUBLICATIONS

International Search Report for PCT/EP2015/064000 dated Sep. 29, 2015; English translation submitted herewith (7 pages).

*Primary Examiner* — Jason D Shanske
(74) *Attorney, Agent, or Firm* — Fitch, Even, Tabin & Flannery L.L.P.

(57) ABSTRACT

The present invention relates to an AACAES system and method in which a heat transfer fluid makes it possible to store heat. The heat transfer fluid, which comprises balls of heat storage material, circulates between two tanks: a hot tank and a cold tank, and passes through at least one heat exchanger.

19 Claims, 3 Drawing Sheets

(51) Int. Cl.
  *F02C 6/16*   (2006.01)
  *F28D 20/02*  (2006.01)
  *F01D 15/10*  (2006.01)

(52) U.S. Cl.
  CPC ............ *F28D 20/023* (2013.01); *F01D 15/10* (2013.01); *F28D 2020/0021* (2013.01); *F28D 2020/0082* (2013.01); *Y02E 60/142* (2013.01); *Y02E 60/145* (2013.01); *Y02E 60/15* (2013.01)

(58) Field of Classification Search
  USPC ........................................................ 60/659
  See application file for complete search history.

(56)          References Cited

U.S. PATENT DOCUMENTS

| 2012/0096845 | A1* | 4/2012  | Ingersoll | F04B 41/02 |
|              |     |         |           | 60/408     |
| 2012/0297772 | A1* | 11/2012 | McBride   | F01B 23/00 |
|              |     |         |           | 60/649     |
| 2013/0220306 | A1  | 8/2013  | Haider    |            |

FOREIGN PATENT DOCUMENTS

| EP | 2 594 753 A1  | 5/2013 |
| FR | 3014182 A1    | 6/2015 |
| GB | 2 476 489 A   | 6/2011 |
| JP | H04-76203 A   | 3/1992 |

\* cited by examiner

COMPRESSED GAS ENERGY STORAGE AND HARVESTING SYSTEM AND METHOD WITH STORAGE OF THE HEAT BY HEAT TRANSFER FLUID

CROSS-REFERENCE TO RELATED APPLICATIONS

This application is a U.S. national phase application filed under 35 U.S.C. § 371 of International Application No. PCT/EP2015/064000, filed Jun. 22, 2015, designating the United States, which claims priority from French Patent Application No. 14/56.350, filed Jul. 3, 2014, which are hereby incorporated herein by reference in their entirety for all purposes.

The field of the present invention relates to compressed air energy storage (CAES). In particular, the present invention relates to an AACAES system (Advanced Adiabatic Compressed Air Energy Storage) which provides for the storage of the air and the storage of the heat generated.

In a compressed air energy storage (CAES) system, the energy, that is to be used at another time, is stored in compressed air form. For the storage, an energy, notably electrical, drives air compressors, and for the withdrawal, the compressed air drives turbines, which can be linked to an electrical generator. The efficiency of this solution is not optimal because a portion of the energy from the compressed air is in the form of heat which is not used. In effect, in the CAES methods, only the mechanical energy of the air is used, that is to say that all the heat produced in the compression is discarded. Furthermore, the efficiency of a CAES system is not optimal, because the system requires the stored air to be heated to produce the expansion of the air. In effect, by way of example, if the air is stored at 8 MPa (80 bar) and at ambient temperature and if the energy is to be harvested by an expansion, the decompression of the air will once again follow an isentropic curve, but this time from initial storage conditions (approximately 8 MPa and 300 K). the air is therefore cooled to unrealistic temperatures (83 K or 191° C.). It is therefore necessary to reheat it, which can be done using a gas burner, or other fuel.

Other variants to this system currently exist. The following systems and methods can notably be cited:
  ACAES (Adiabatic Compressed Air Energy Storage) in which the air is stored at the temperature due to the compression. However, this type of system requires a bulky and expensive specific storage system.
  AACAES (Advanced Adiabatic Compressed Air Energy Storage) in which the air is stored at ambient temperature and the heat due to the compression is also stored in a heat storage system TES (Thermal Energy Storage). The heat stored in the TES is used to heat the air before its expansion.

Refinements of the AACAES systems have related to the construction of the heat storage system TES by means of a fixed tank of heat storage material. For example, the patent application filed under the number FR 13/61835 describes an AACAES system in which the heat storage system is produced by a tank containing heat storage materials at different temperature levels. However, for these static heat storage systems TES (static in as much as there is no movement of the heat storage materials), it is necessary to manage the thermal gradient between two cycles, which makes the system complex.

Another solution envisaged for the heat storage system TES is the use of a heat transfer fluid, making it possible to store the heat deriving from the compression to restore it to the air before the expansion by means of heat exchangers. For example, the patent application EP 2447501 describes an AACAES system in which oil, used as heat transfer fluid, circulates in a closed circuit to exchange heat with the air. Moreover, the patent applications EP 2530283 and WO 2011053411 describe an AACAES system, in which the heat exchanges are produced by a heat transfer fluid circulating in a closed circuit, the closed circuit comprising a single tank of heat transfer fluid.

However, the systems described in these patent applications require significant storage volumes because of the heat transfer fluid used, and/or because the heat transfer fluid is stored in a single tank and/or because of the arrangement of the heat transfer fluid circulation circuits.

To mitigate these drawbacks, the present invention relates to an AACAES system and method in which the heat transfer fluid, which comprises balls of heat storage material, circulates between two tanks: a hot tank and a cold tank. An installation with two heat transfer fluid tanks makes it possible to maintain the transfer potential between the heat transfer fluid and the air. The use of balls in the heat transfer fluid makes it possible to reduce the heat storage volume, by virtue of the significant storage capacity of said balls.

THE SYSTEM AND METHOD ACCORDING TO THE INVENTION

The invention relates to a compressed gas energy storage and harvesting system comprising at least one gas compression means, storage means for said compressed gas, at least one expansion means for said compressed gas, heat exchange means between said compressed gas and a heat transfer fluid, storage means for said heat transfer fluid, said heat exchange means being arranged at the output of said gas compression means and/or at the input of said gas expansion means. Said system comprises means for circulating said heat transfer fluid from one storage means for said heat transfer fluid to another storage means for said heat transfer fluid through at least one heat exchange means and said heat transfer fluid comprises heat storage balls.

According to the invention, said heat storage balls have a diameter of between 10 nm and 50 mm.

Advantageously, said balls are produced in alumina, in metal or by micro or nanocapsules of phase change material, such as paraffins, metals or salts.

Preferably, said balls can withstand temperatures of between 20 and 700° C.

According to an aspect of the invention, said heat transfer fluid comprises oil, air, water, or molten salts.

According to an embodiment of the invention, said energy storage and harvesting system comprises several staged gas compression means, several staged expansion means, and a heat exchange means arranged between each stage of said compression means and/or of said expansion means.

According to a first variant, said heat transfer fluid storage means comprise two storage drums, said heat transfer fluid circulating from a first storage drum, to a second storage drum, through each heat exchange means.

Alternatively, said heat transfer fluid storage means comprise two storage drums for each heat exchange means, said heat transfer fluid circulating from a first storage drum to a second storage drum through said heat exchange means.

Furthermore, the invention relates to a compressed gas energy storage and harvesting method. For this method, the following steps are carried out:

a) a gas is compressed;
b) said compressed gas is cooled by heat exchange with a heat transfer fluid;
c) said cooled compressed gas is stored;
d) said stored compressed gas is heated by heat exchange with said heat transfer fluid; and
e) said heated compressed gas is expanded to generate an energy, said heat transfer fluid is made to circulate between storage means for said heat transfer fluid for at least one heat exchange with said gas and said heat transfer fluid comprises heat storage balls.

Advantageously, said heat storage balls have a diameter of between 10 nm and 50 mm.

Preferentially, said balls are produced in aluminas, in metals or by micro or nanocapsules of phase change material, such as paraffins, metals or salts.

According to a feature of the invention, said balls withstand temperatures of between 20 and 700° C.

Furthermore, said heat transfer fluid can comprise oil, air, water or molten salts.

According to an aspect of the invention, the steps a) and b) and/or the steps d) and e) are reiterated.

According to a variant, all the heat exchanges are produced by means of a heat transfer fluid circulating from a first heat transfer fluid storage drum (5, 6) to a second heat transfer fluid storage drum (6, 5).

Alternatively, each heat exchange is produced separately by means of a heat transfer fluid circulating from a first storage drum (5, 6) for said heat transfer fluid to a second storage drum (6, 5) for said heat transfer fluid.

BRIEF DESCRIPTION OF THE FIGURES

Other features and advantages of the method according to the invention will become apparent on reading the following description of nonlimiting exemplary embodiments, with reference to the figures attached and described herein below.

DETAILED DESCRIPTION OF THE INVENTION

Figure 1:
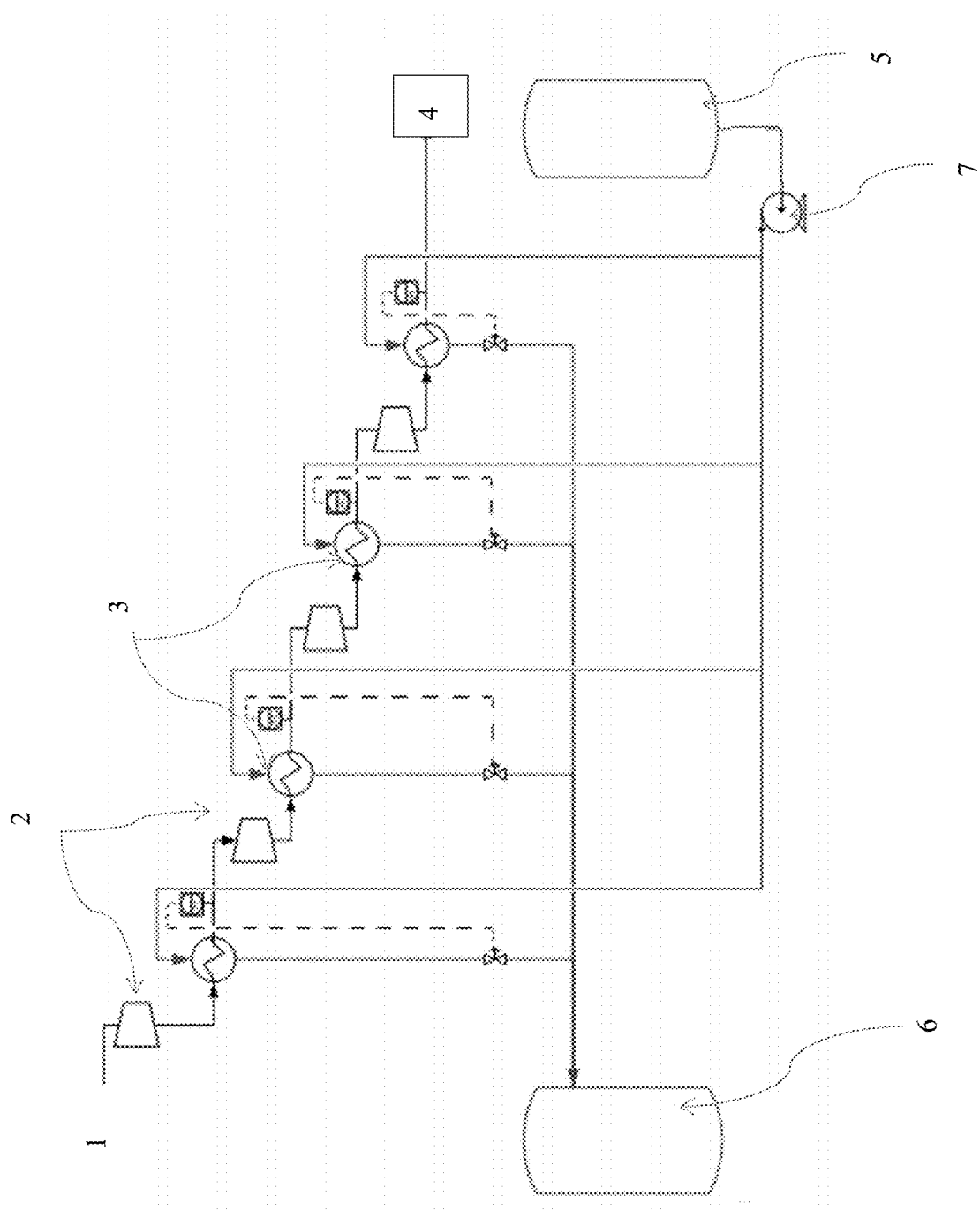
FIG. 1 illustrates a compressed gas energy storage and harvesting system, according to a first embodiment of the invention, in energy storage mode of operation.

The present invention relates to a compressed gas energy storage and harvesting system equipped with a heat storage means (AACAES). The system according to the invention comprises:
- at least one gas compression means (or compressor), preferably the system comprises several staged gas compression means, the gas compression means can be driven by a motor, notably an electric motor,
- at least one means for storing gas compressed by the gas compression means, the compressed gas storage means can be a tank, an underground cavity or equivalent, etc.
- at least one gas expansion means (or expansion valve) making it possible to expand the compressed and stored gas, the system preferably comprises several staged gas expansion means, the gas expansion means makes it possible to generate an energy, notably an electrical energy by means of a generator,
- at least one heat exchange means, or heat exchanger, between the compressed gas and a heat transfer fluid for cooling the compressed gas at the output of the gas compression means and/or for heating the compressed gas at the input of the gas expansion means,
- heat transfer fluid storage means,
- circuits for circulating the heat transfer fluid between the heat transfer fluid storage means by passing through at least one heat exchange means.

The terms "staged compression or expansion means" are used when a plurality of compression or expansion means are mounted in succession one after the other in series: the compressed or expanded gas at the output of the first compression or expansion means then passes into a second compression or expansion means, and so on. A compression or expansion stage is then called a compression or expansion means of the plurality of staged compression or expansion means. Advantageously, when the system comprises a plurality of compression and/or expansion stages, a heat exchange means is arranged between each compression and/or expansion stage. Thus, the compressed air is cooled between each compression, which makes it possible to optimize the efficiency of the next compression, and the expanded air is heated between each expansion, which makes it possible to optimize the efficiency of the next expansion. The number of compression stages and the number of expansion stages can be between 2 and 10, preferably between 3 and 5. Preferably, the number of compression stages is identical to the number of expansion stages. Alternatively, the AACAES system according to the invention can contain a single compression means and a single expansion means.

The system according to the invention is suited to any type of gas, notably air. In this case, the air at the input used for the compression can be taken from the ambient air and the air at the output after the expansion can be released into the ambient air. Hereinafter in the description, only the variant embodiment with compressed air will be described, but the system and the method are valid for any other gas.

The heat exchange means make it possible, upon the storage of the compressed gas (compression), to recover a maximum of heat deriving from the compression of the gas at the output of the compressors and to reduce the temperature of the gas before the transition to the next compression or before the storage. For example, the compressed gas can switch from a temperature higher than 150° C. for example approximately 190° C., to a temperature lower than 80° C., for example approximately 50° C. The heat exchange means make it possible, in the restoration of the energy to restore a maximum of stored heat by increasing the temperature of the gas before the transition to the next expansion. For example, the gas can switch from a temperature lower than 80° C., for example approximately 50° C., to a temperature higher than 150° C., for example approximately 180° C.

According to the invention, the heat transfer fluid circulates between two heat transfer fluid storage means and passes through at least one heat exchange means. Thus, the heat transfer fluid storage means comprise at least one hot heat transfer fluid storage tank, called hot drum and one cold heat transfer fluid tank, called cold drum. The hot drum stores the heat deriving from the heat exchanges in the compression and the cold drum stores the heat transfer fluid cooled upon the expansion. For the cooling of the compressed air (energy storage), the heat transfer fluid circulates from the cold drum, passes through at least one heat exchanger situated at the output of a compression means for cooling the air, then is stored in the hot drum. For the reheating of the air (energy restoration), the heat transfer fluid circulates from the hot drum, passes through at least one exchanger situated at the input of an expansion means for heating the air, then is stored in the cold drum. According to the invention, the hot and cold drums have no direct link; to go from one to the other the heat transfer fluid systematically passes through at least one heat exchange means.

Ideally, upon the storage of the compressed air, the input temperature of the ball-filled heat transfer fluid is at the temperature of the output of the exchanger on the compressed air side and the output temperature of the heat transfer fluid is at the temperature of the input of the exchanger on the compressed air side (compressor output).

This arrangement of the heat transfer fluid storage means with a cold drum and a hot drum allows for a separate storage of the cold heat transfer fluid and of the hot heat transfer fluid, which allows for an effective storage of the heat energy, with a minimum of losses.

The control of the compressor input temperature is ensured by the control of the flow rate of the heat transfer fluid mix.

Furthermore, the system according to the invention provides flexibility of operation.

According to the invention, the heat transfer fluid includes heat storage balls. The heat storage balls are elements of small dimensions capable of storing up and restoring heat. The heat storage balls have a high heat capacity and more specifically a high energy density (or storage capacity) expressed in $MJ/m^3$. The balls can be substantially spherical and have a diameter of a few tens of nanometers to a few tens of millimeters depending on the nature thereof, preferably, the diameter of the balls is between 10 nm and 50 mm, in particular between 50 μm and 10 mm. The balls according to the invention are produced in materials that can be used in temperature ranges of between 20° and 700° C. The balls used can be produced by aluminas, or in metal or phase change materials (PCM) encapsulated or non-encapsulated within the operating temperature range. The nature of the phase change materials PCM can be of different types, including:
salts (with a storage capacity of between 300 to 1000 $MJ/m^3$) : for example NaCl, $NaNO_3$, $KNO_3$, etc.,
metals (with a storage capacity of between 100 and 2000 $MJ/m^3$): for example magnesium, aluminum, copper, antimony, etc.

The heat storage balls make it possible to store up a greater quantity of heat than the fluid alone, so the volume needed for heat transfer fluid containing balls is less than the volume needed for a conventional heat transfer fluid. Thus, it is possible to reduce the storage volumes of the TES.

The heat transfer fluid can be of different kinds: molten salts (for example $NaNO_2$, $NaNO_3$, $KNO_2$, etc.), oil, air, water, etc., so that it is easy to implement from a heat exchange and hydraulic point of view according to the type of balls used and the type of exchanger installed.

The choice of the nature of the heat transfer fluid and of the balls depends on the temperature range in which it will be used, which is directly linked to the configuration of the compression (number of stages and compression rate) storage pressure of the compressed air of the TES. Upon the storage of the compressed air, the ball-filled heat transfer fluid can be transferred from a cold storage drum to a hot storage drum via a pump. The pump can also be used to place the balls in suspension in the drums. In the energy restoration phase, the ball-filled heat transfer fluid can be transferred from the hot storage drum to the cold storage drum via a pump. The pump can be the same as that used in the storage of the compressed air.

According to a first embodiment of the invention, the heat transfer fluid storage means comprise only two storage drums: a hot drum and a cold drum. The heat transfer fluid circulates between these two drums by passing through all the heat exchange means. If the AACAES system is a staged system (with several compressions and/or expansions), in the heat transfer fluid circuit, the flow of the heat transfer fluid is divided into parallel branches. Each parallel branch comprises a single air heat exchanger. The direction of circulation of the heat transfer fluid is the same in all the branches. This embodiment makes it possible to limit the number of heat transfer fluid storage drums to two.

FIG. 1 presents an AACAES system according to a nonlimiting example of the first embodiment of the invention, for an energy storage operation (i.e. by air compression). As illustrated, the AACAES system according to the invention comprises four compression stages produced by air compressors 2 which successively compress the air taken from the ambient air 1. Between each compression stage, there is a heat exchanger 3, within which the air compressed and heated (by the compression) is cooled by the heat transfer fluid. At the output of the last compression stage, the compressed air is stored in a compressed air storage means 4. For the compression mode of operation, the heat transfer fluid circulates from a cold storage drum 5 by means of a pump 7 to a hot storage drum 6 by passing through four heat exchangers 3 by means of four parallel circuit branches.

Figure 2:
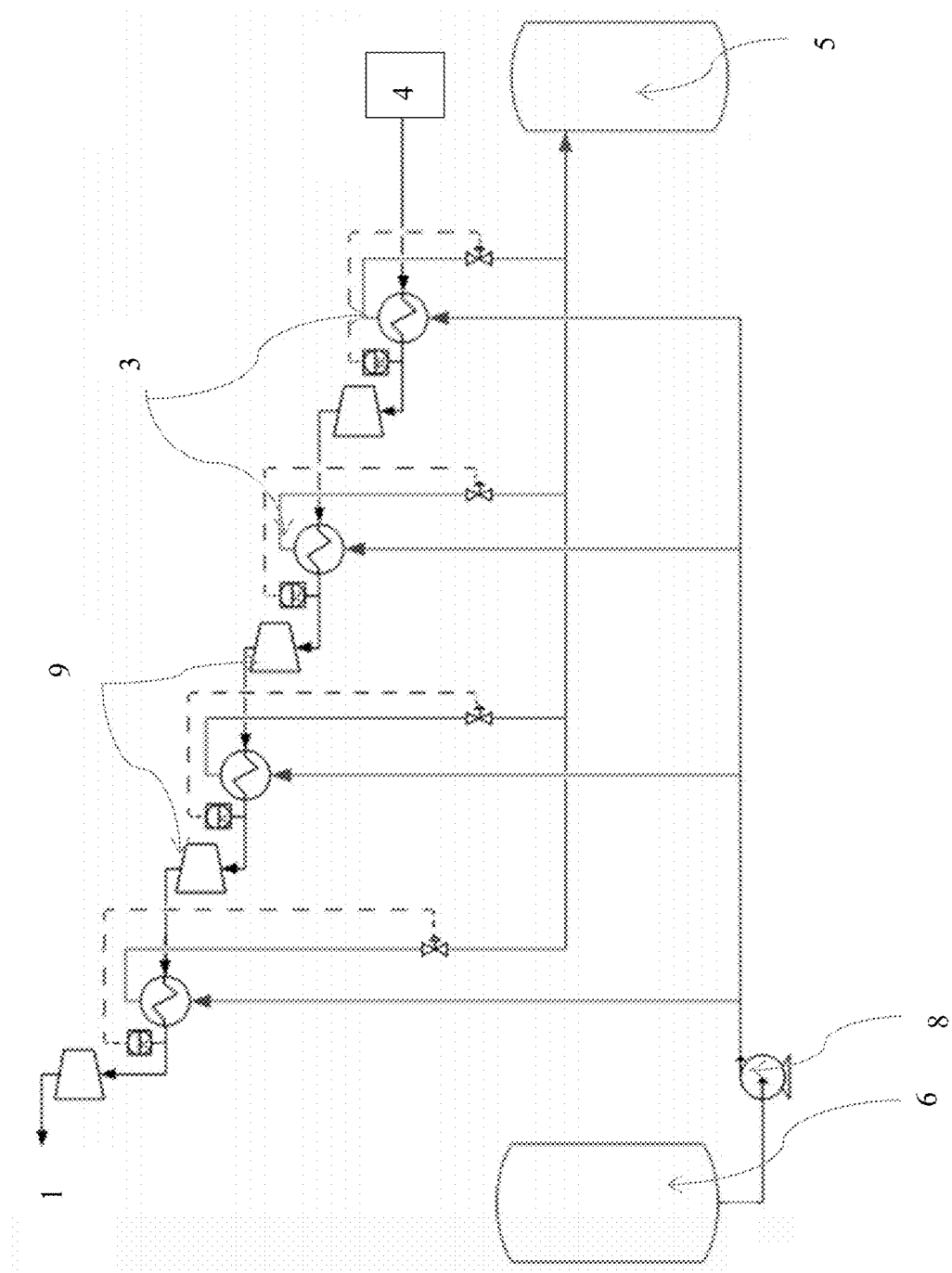
FIG. 2 illustrates a compressed gas energy storage and harvesting system, according to the first embodiment of the invention, in stored energy restoration mode of operation.

FIG. 2 presents an AACAES system according to a nonlimiting example of the first embodiment of the invention, for an energy restoration operation (by air expansion). As illustrated, the AACAES system according to the invention comprises four expansion stages produced by expansion means 9 which successively expand the compressed air contained in the compressed air storage means 4. Between each expansion stage 9, there is a heat exchanger 3, within which the air cooled by the expansion is heated by the heat transfer fluid. At the output of the last expansion stage, the expanded air is released into the ambient environment. For the expansion mode of operation, the heat transfer fluid circulates from the hot storage drum 6 by means of a pump 8 to the cold storage drum 5 by passing through the four heat exchangers 3 by means of four parallel circuit branches. The hot storage drum contains the hot heat transfer fluid which was used to cool the air compressed in the compression.

According to a second embodiment of the invention, the heat transfer fluid storage mean comprise two heat transfer fluid storage drums (a hot drum and a cold drum) for each compression or expansion stage. The heat transfer fluid circulates between these two storage drums by passing through a single heat exchange means (that of the stage concerned). This embodiment makes it possible to limit the size of the heat transfer fluid storage drums, because the volume of fluid to be stored is reduced because the heat transfer fluid passes only in a single heat exchanger. In the case where the number of compression stages is identical to the number of expansion stages, the energy storage and harvesting system comprises as many cold storage drums and hot storage drums as there are compression and expansion stages.

Figure 3:
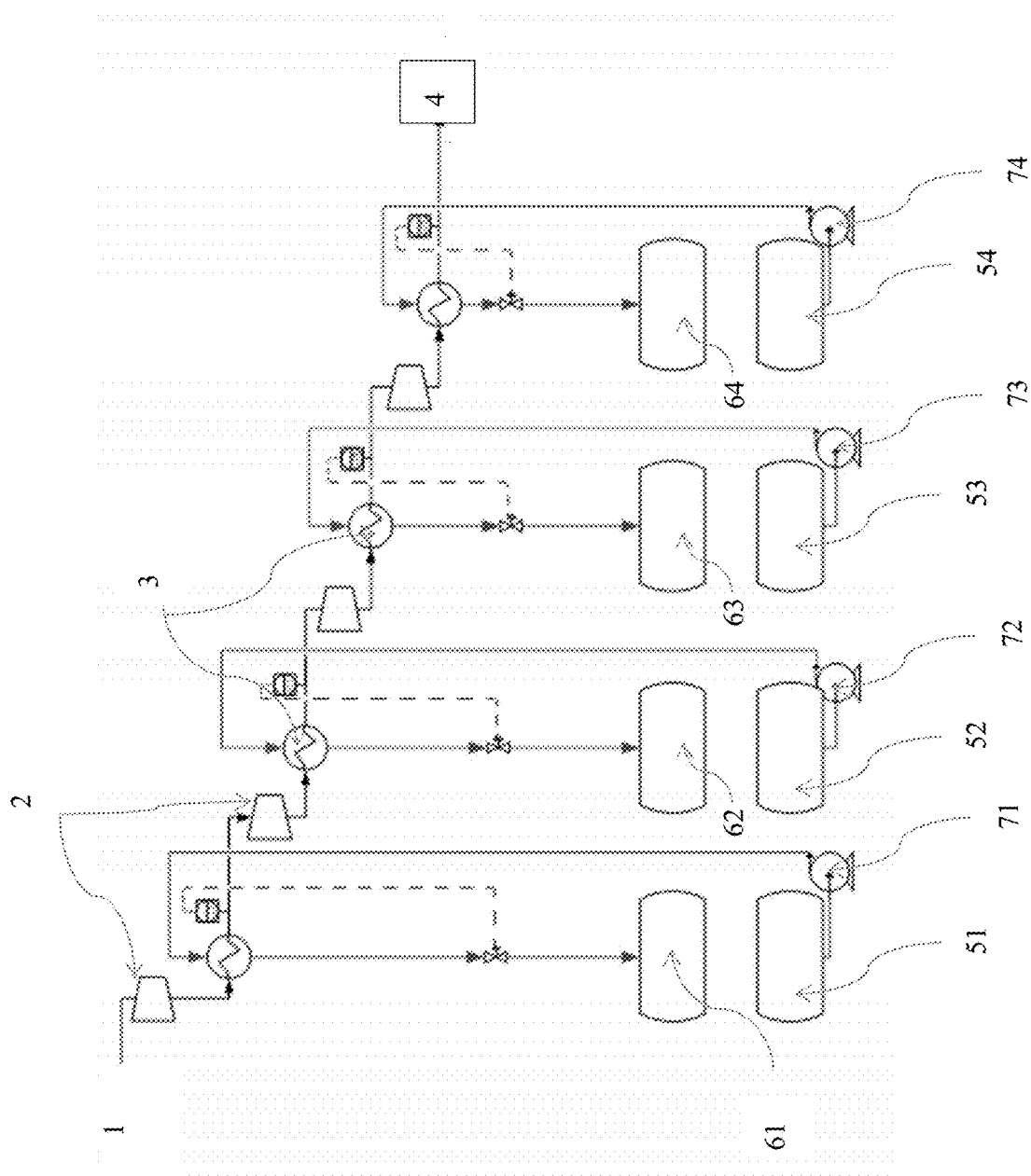
FIG. 3 illustrates a compressed gas energy storage and harvesting system, according to a second embodiment of the invention, in energy storage mode of operation.

FIG. 3 presents an AACAES system according to a nonlimiting example of the second embodiment of the invention, for an energy storage operation (i.e. by air compression). As illustrated, the AACAES system according to the invention comprises four compression stages produced by air compressors 2 which successively compress air taken from the ambient air 1. Between each compression stage there is a heat exchanger 3, within which the air compressed and heated (by the compression) is cooled by the heat transfer fluid. At the output of the last compression stage, the compressed air is stored in a compressed air storage means 4. The system comprises four cold drums 51, 52, 53, 54, four hot drums 61, 62, 63, 64 and four pumps 71, 72, 73, 74. For each stage, the heat transfer fluid circulates from a cold storage drum 51, 52, 53, 54 to a hot storage drum 61, 62, 63, 64 by passing through a single heat exchanger 3 by means of a pump 71, 72, 73, 74.

For an energy restoration operation, i.e. by air expansion (not represented), the AACAES system according to this second embodiment of the invention comprises four expansion stages produced by expansion means which successively expand the compressed air contained in the compressed air storage means. Between each expansion stage there is a heat exchanger, within which the compressed air is heated by the heat transfer fluid. At the output of the last expansion stage, the expanded air is released into the ambient environment. The system comprises four cold storage drums, four hot storage drums and four pumps. The heat transfer fluid circulates from a hot drum to a cold drum by passing through a single heat exchanger by means of a pump. Each hot drum contains the hot heat transfer fluid which was used to cool the compressed air in the compression.

Other embodiments of the invention can be envisaged, in particular by the combination of the two embodiments described previously. For example, the heat transfer fluid can be used for two compression or expansion stages. Thus, it is possible to limit both the number of heat transfer fluid storage drums and their dimensions.

The invention can therefore allow for the cross-over of the temperatures in the inter-stage exchangers, notably by means of a double-pipe exchanger, a spiral-wound exchanger, several exchangers in series. The use of the heat transfer fluid filled with heat storage materials also makes it possible to be able to operate with different cycle times, that is to say that the AACAES system can continue to function even if the air storage cycle time and the air withdrawal cycle time are different. Furthermore, the system according to the invention allows for operational flexibility and simplicity; the regulation is done with the output temperature on the compressed air side, and the system requires a pump, two storage drums and heat exchangers.

The present invention also relates to a compressed gas energy storage and harvesting method, in which the following steps are carried out:
a) a gas is compressed, notably by means of an air compressor;
b) the compressed gas is cooled by heat exchange with a heat transfer fluid, in particular by means of a heat exchanger;
c) the cooled compressed gas is stored, notably by a compressed gas storage means;
d) the stored compressed gas is heated by heat exchange with the heat transfer fluid heated in the step b); and
e) the heated compressed gas is expanded to generate an energy, for example by means of a turbine to generate an electrical energy.

According to the invention, the heat transfer fluid is made to circulate between heat transfer fluid storage means for at least one heat exchange with the gas. Furthermore, the heat transfer fluid includes heat storage balls.

The method according to the invention can be implemented by the system according to the invention, in particular the heat transfer fluid can be as described previously.

According to an aspect of the invention, the method comprises several successive compression steps, by means of air compressors placed in series. In this case, the steps a) and b) are reiterated for each compression stage.

According to a feature of the invention, the method comprises several successive expansion stages, by expansion means placed in series. In this case, the steps d) and e) are reiterated for each expansion step.

According to the first embodiment of the invention, illustrated in FIGS. 1 and 2, the heat transfer fluid is made to circulate between two storage drums (a cold drum and a hot drum), the heat transfer fluid being used for all the steps of heat exchange with the compressed gas. The heat transfer fluid is distributed in parallel branches which each comprise a single heat exchanger.

According to the second embodiment of the invention, illustrated in FIG. 3, for each heat exchange step, the heat transfer fluid is made to circulate between two storage drums (a cold drum and a hot drum), the heat transfer fluid being used for a single step of heat exchange with the gas. For each compression/expansion step, a heat transfer fluid is therefore made to circulate in a closed circuit.

The invention claimed is:

1. A compressed gas energy storage and harvesting system, the system comprising:
   at least one gas compression means,
   storage means for compressed gas,
   at least one expansion means for the compressed gas,
   at least one heat exchange means arranged at the output of the at least one gas compression means and/or at the input of at least one expansion means, the at least one heat exchange means being configured to transfer energy between the compressed gas and a heat transfer fluid, the heat transfer fluid comprising heat storage balls,
   first storage means for the heat transfer fluid,
   second storage means for the heat transfer fluid, and
   means for circulating the heat-transfer fluid from the first storage means for the heat transfer fluid to the second storage means for the heat transfer fluid through the at least one heat exchange means.

2. The system as claimed in claim 1, wherein the heat storage balls have a diameter of between 10 nm and 50 nm.

3. The system as claimed in claim 1, in which the heat storage balls comprise alumina, metal, or micro or nano-capsules of phase change material.

4. The system as claimed in claim 1, wherein the heat storage balls withstand temperatures of between 20 and 700° C.

5. The system as claimed in claim 1, wherein the heat transfer fluid comprises oil, air, water, or molten salts.

6. The system as claimed in claim 1, wherein the at least one gas compression means comprises a several staged gas compression means, the at least one expansion means comprises a several staged expansion means, and a heat exchange means of the at least one heat exchange means is arranged between each stage of the several staged gas compression means and/or each stage of the several staged expansion means.

7. The system as claimed in claim 6, wherein the first storage means for heat transfer fluid comprises a first storage drum and the second storage means for heat transfer fluid comprises a second storage drum, the heat transfer fluid circulating from the first storage drum to the second storage drum through each heat exchange means of the at least one heat exchange means.

8. The system as claimed in claim 6, wherein the first heat transfer fluid storage means comprises a first storage drum for each heat exchange means of the at least one heat exchange means, the second heat transfer fluid storage means comprises a second storage drum for each heat exchange means the at least one heat exchange means, the heat transfer fluid circulating from the first storage drum to the second storage drum through a respective heat exchange means of the at least one heat exchange means.

9. The system as claimed in claim 3, wherein the heat storage balls comprise the phase change material, and the phase change material is selected from paraffins, metals or salts.

10. A compressed gas energy storage and harvesting method comprising steps of:
    a) compressing a gas;
    b) cooling the compressed gas by heat exchange with a heat transfer fluid;
    c) storing the cooled compressed gas;
    d) heating the stored compressed gas by heat exchange with the heat transfer fluid; and
    e) expanding the heated compressed gas to generate an energy,
    wherein the heat transfer fluid is made to circulate between storage means for the heat transfer fluid for at least one heat exchange with the gas and wherein the heat transfer fluid comprises heat storage balls.

11. The method as claimed in claim 10, wherein the heat storage balls have a diameter of between 10 nm and 50 mm.

12. The method as claimed in claim 10, wherein the heat storage balls comprise aluminas, metals, or micro or nano-capsules of phase change material.

13. The method as claimed in claim 10, in which the heat storage balls withstand temperatures of between 20 and 700° C.

14. The method as claimed in claim 10, wherein the heat transfer fluid comprises oil, air, water, or molten salts.

15. The method as claimed in claim 10, in which the steps a) and b) and/or the steps d) and e) are reiterated.

16. The method as claimed in claim 15, in which all the heat exchanges are produced by means of the heat transfer fluid circulating from a first heat transfer fluid storage drum to a second heat transfer fluid storage drum.

17. The method as claimed in claim 15, in which each heat exchange is produced separately by means of the heat transfer fluid circulating from a first storage drum for the heat transfer fluid to a second storage drum for the heat transfer fluid.

18. The method as claimed in claim 12, wherein the heat storage balls comprise the phase change material, and the phase change material is selected from paraffins, metals or salts.

19. A compressed gas energy storage and harvesting system, the system comprising:
    a turbine for compression and expansion of gas,
    a vessel for storing compressed gas emitted from the turbine,
    a heat exchanger configured to transfer energy between the compressed gas and a heat transfer fluid, the heat transfer fluid comprising heat storage balls,
    a first vessel for storing the heat transfer fluid in a heated state, and
    a second vessel for storing the heat transfer fluid in a cooled state,
    the heat exchanger being connected between the first vessel and the second vessel to allow the heat transfer fluid to flow through the heat exchanger when the heat transfer fluid flows between the first vessel and the second vessel.

* * * * *